United States Patent [19]
Hoag et al.

[11] Patent Number: 4,486,887
[45] Date of Patent: Dec. 4, 1984

[54] HIGH-POWER LASERS

[75] Inventors: Ethan D. Hoag, East Boston; Glenn W. Zieders, Marble-Head, both of Mass.

[73] Assignee: Metalworking Lasers International Ltd., Neve Sharet, Israel

[21] Appl. No.: 410,594

[22] Filed: Aug. 23, 1982

[51] Int. Cl.³ ............................................... H01S 3/22
[52] U.S. Cl. ........................................ 372/58; 372/93; 372/107; 372/29; 372/55; 372/700
[58] Field of Search ........................ 372/93, 94, 55, 99, 372/107, 108, 58, 29, 31

[56] References Cited

U.S. PATENT DOCUMENTS 4,317,090  2/1982  Nagai et al. ............................ 372/58
4,321,558  3/1982  Zappa ................................... 372/58

Primary Examiner—William L. Sikes
Assistant Examiner—Léon Scott, Jr.
Attorney, Agent, or Firm—Benjamin J. Barish

[57] ABSTRACT

A high-power flowing-gas laser comprises a laser channel folded to include at least two legs angularly disposed to each other in a common plane and having a single folding mirror between them such that the laser rays through one leg, on the upstream side thereof with respect to the gas flowing transversely across that leg, are reflected by the folding mirror so as to be transposed to the downstream side of the other leg with respect to the gas flowing transversely across the other leg. A number of embodiments are described wherein the laser channel is folded to include four or other even number of legs according to a polygonal configuration, there being a separate flowing gas channel for each leg, all the gas channels directing the gas flow radially inwardly to a common collection region. Among the advantages provided by the described constructions are compensation for phase distortion and amplitude variations, and maximum laser channel length and laser output for a given system size and volume.

21 Claims, 5 Drawing Figures

HIGH-POWER LASERS

BACKGROUND OF THE INVENTION

The present invention relates to lasers, and particularly to high-power flowing-gas lasers.

There has been considerable activity in recent years to produce high-power flowing-gas lasers for use particularly in the metalworking industries. Examples of some of the known lasers of this type are described in U.S. Pat. Nos. 3,641,457; 3,702,973; 3,886,481; 4,058,778; 4,317,090; and 4,321,558. One of the main problems in the design of such high-power lasers is the dissipation of the heat, since power lasers cannot operate efficiently at unduly high temperatures. For example, the $CO_2$ laser, which is the one mainly used today for high power applications, cannot operate efficiently at temperatures much about 200° C. While the heat dissipation, and therefore the power output, can both be increased by increasing the length of the laser channel, this entails a considerable increase in the size and cost of the laser.

One object of the present invention, therefore, is to provide a novel high-power flowing-gas laser which maximizes the length of the laser channel and of the power output capability of the laser for a given system size.

Another problem involved in the known high-power flowing-gas lasers is optical distortion in the outputted beam, mainly arising from phase distortion due to a density gradient in the flowing gas, and amplitude variations due to a gain gradient in the flowing gas.

Thus, in a laser wherein the laser gas flows transversely across the laser channel, there is a substantial temperature and density gradient in the flowing gas. The temperature is lowest at the upstream side of the flowing gas channel and increases across the flowing gas channel so that the gas is at a substantially higher temperature at the downstream side of the channel. The density gradient is inverse to the temperature gradient, i.e., the density is highest at the upstream side and lowest at the downstream side of the flowing gas channel. This density gradient produces a phase distortion in the laser channel traversed by the flowing gas.

In addition, there is also a substantial gain gradient in the flowing gas channel, the gain being highest at the upstream side of the channel and lowest at the downstream side because of the decrease in the population inversion from the upstream side to the downstream side of the channel. This gain gradient produces variations in the amplitude of the laser beam, or mode, within the laser channel.

Accordingly, another object of the present invention is to provide a high-power, flowing-gas laser which includes compensation for phase distortion due to the density gradient in the gas flowing transversely across the laser channel, and also compensation for amplitude variations due to the gain gradient in the flowing gas.

SUMMARY OF THE INVENTION

According to one aspect of the present invention, there is provided a high-power flowing-gas laser comprising a laser channel and means for producing a flow of a laser gas transversely across the laser channel; characterized in that the laser channel is folded to include at least two legs angularly disposed to each other in a common plane and having a single folding mirror between the two legs such that the laser rays through one leg, on the upstream side thereof with respect to the gas flowing transversely across the one leg, are reflected by the folding mirror so as to be transposed to the downstream side of the other leg with respect to the gas flowing transversely across the other leg.

Such an arrangement provides compensation for phase distortion due to the density gradient, for velocity variations due to the turns in the flow, and for amplitude variations due to the gain gradient, in the gas flowing transversely across the two legs.

The foregoing technique for providing this compensation is to be distinguished from the known "roof-top mirror" technique, wherein a laser channel is divided into two legs parallel to each other having two 90-degree-oriented folding mirrors between them so as to reflect the laser rays through 180°, from one parallel leg to the other parallel leg; in this known technique, there is a single flowing gas channel for producing the gas flow transversely across both legs. In the arrangement of the present invention, however, the two adjacent legs are angularly disposed to each other (i.e., at an angle less than 180°); this makes it necessary to include only a single mirror between them, thereby avoiding the power loss produced by the second mirror in the "roof-top mirror" technique. In addition, by providing a separate flowing gas channel for each of the legs, in the arrangement of the present invention (as distinguished from the "roof-top mirror" technique wherein the flowing gas channel is common to both legs), a substantial improvement is obtained in the compensation for phase distortion due to the density gradient, and for amplitude variations due to the gain gradient, in the gas flowing transversely across the laser channel legs.

The laser channel may be folded to include more than two legs. Preferably, there is provided an even number of channel legs with a single folding mirror between each pair of adjacent legs in a common plane. Particularly good results are obtainable when the laser channel legs, for example four, are folded in a polygonal configuration with a separate flowing gas channel provided for each leg, each channel directing the gas to flow radially inwardly to a common collection region for the gas. Such an arrangement not only provides the alternate transposition between the upstream and downstream rays mentioned above to produce maximum compensation for phase distortion and amplitude and velocity variations, but also maximizes the laser channel length, and also the laser output, for a given system size and volume.

Several embodiments of the invention are described below for purposes of example. In one described embodiment, the laser channel is folded according to the single-polygonal configuration, e.g., a square configuration in the example illustrated. In a second described embodiment, the laser channel length is increased over that of a single polygon (360°), and is folded according to a configuration defining two coaxial polygons, i.e., increasing the laser length from 360° to 720°.

A further embodiment of the invention is described wherein the folded laser channel includes a first polygon (e.g., a square) of legs defining a resonator region, and a second similar polygon of legs coaxial with the first polygon and defining an amplifier region.

A still further embodiment of the invention is described wherein the laser channel is folded to include a first plurality of legs in a first plane, and a second plurality of legs in a second plane parallel to the first plane, there being a single folding mirror between the adjacent legs of each plane, and a double-folding mirror between the connecting legs of the two planes. The legs and folding mirrors are arranged to provide two-dimensional compensation (i.e., compensation both parallel to and transversely in the direction of gas flow) for phase distortion due to the density gradient, for velocity variations due to turns in the flow, and for amplitude variation due to the gain gradient, in the gas flow.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
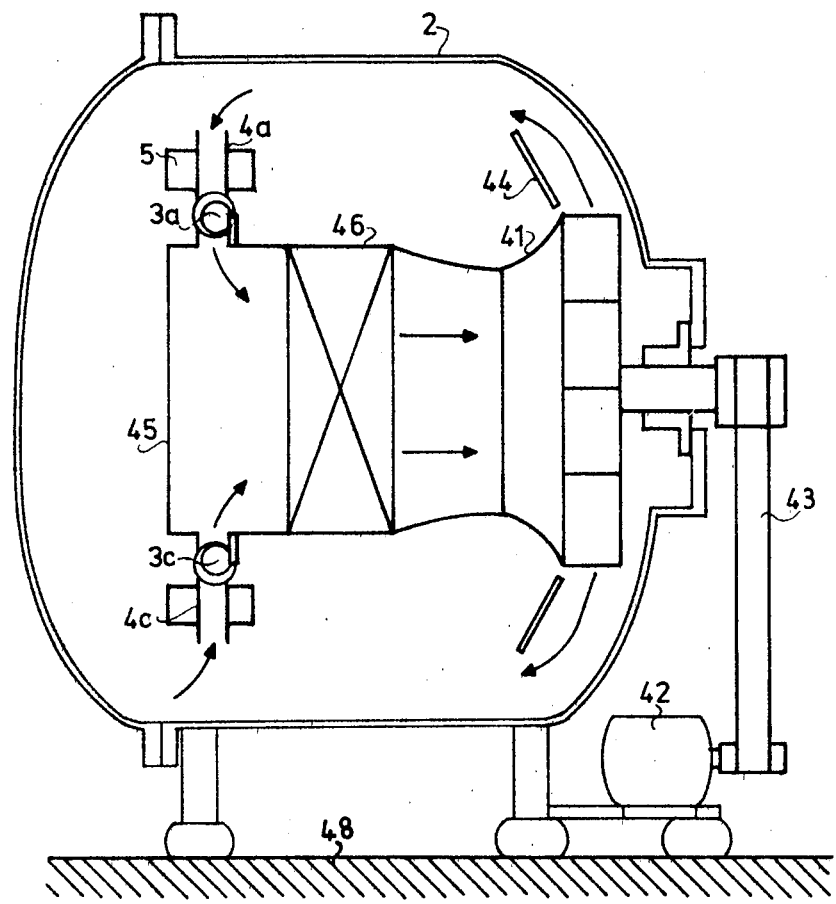
FIG. 1 is a side elevational view schematically illustrating one form of laser constructed in accordance with the present invention.

With reference first to FIG. 1, there is illustrated a high-power flowing-gas laser including an outer housing 2 capable of withstanding an internal pressure which is different from atmospheric. In this type of laser, the pressure is below about 0.2 atmospheres. The preferred pressure for the arrangement illustrated, particularly for the type of electric discharge to be used for exciting the laser gas, is about 0.05 atmospheres. The gas is preferably one of the known $CO_2$ mixtures commonly used in high-power gas lasers.

Figure 2:
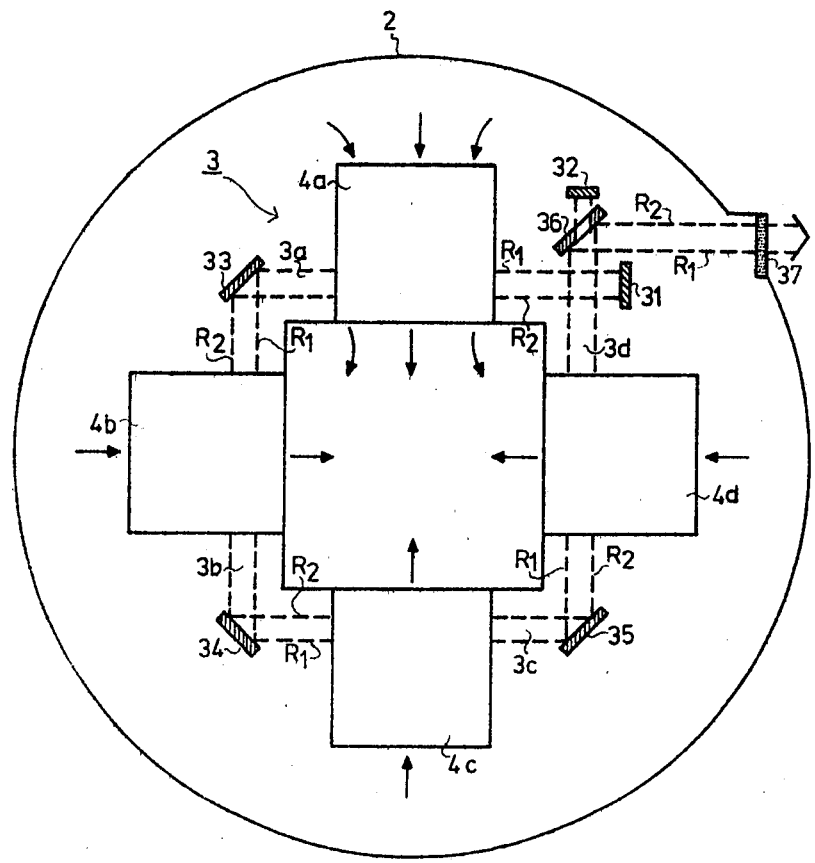
FIG. 2 is a schematic view, transverse to that of FIG. 1, and showing particularly the folded laser channel and the flowing gas channels in the laser of FIG. 1.

The laser channel in which lasing occurs is in the form of a folded optical cavity or resonator, generally designated 3 in FIG. 2; in the FIG. 2 configuration, it is folded so as to be constituted of four legs arranged in a square configuration. Thus, the resonator 3 is defined by a primary mirror 31 at one end, a feedback mirror 32 at the opposite end, and three folding mirrors 33, 34, and 35, each disposed between a pair of adjacent legs and oriented 45° to the beam, to thereby reflect the rays from one leg to the next.

More particularly, and as shown in FIG. 2, leg 3a of laser channel 3 is defined by primary mirror 31 and folding mirror 33; leg 3b is defined by folding mirrors 33 and 34; leg 3c is defined by folding mirrors 34 and 35; and leg 3d is defined by folding mirrors 35 and feedback mirror 32. The output mirror 36 is a scraper mirror just in front of feedback mirror 32, and removes a portion of the laser rays reflected within the four-leg optical cavity and deflects same through an output window 37, such as a ZnSe window, to produce the output laser beam.

The illustrated laser includes means for producing a flow of the laser gas transversely across each of the legs 3a–3d of the folded laser channel. Each laser channel leg is served by a separate gas flow channel, designated 4a–4d, respectively, in FIG. 2. To produce the gas flow through those channels, the laser is provided with an impeller 41 (FIG. 1) disposed within housing 2, which impeller is driven by an electric motor 42 disposed externally of the housing and coupled to the impeller 41 by a belt 43. The output end of impeller 41 is provided with a diffuser 44, the gas being directed from the diffuser by the outer housing 2 to the inlet ends of the gas flow channels 4a–4d.

The gas flowing via the flow channels 4a–4d flows transversely through the respective legs 3a–3d of the folded laser channel, but first the gas is excited by an electrical discharge system, generally designated 5 in FIG. 1, provided at the upstream side of each laser channel leg. Various types of electrical discharge systems are known and could be used, e.g., one including an external ionization source, such as an electron beam. However, in the present case it is preferred to use a high frequency electrical discharge system including segmented electrodes and ballasting, such as known in the art, to produce a self-sustained discharge.

The gas flowing through the gas channels 4a–4d is subjected to an increase in temperature as the gas flows transversely across the respective legs 3a–3d of the laser optical cavity 3, so that the gas exiting from channels 4a–4d is at a substantially higher temperature than the gas entering them. The heated gas is directed, e.g., by a wall 45 (FIG. 1), to flow through a heat exchanger 46; and the outputted cooled gas is directed to the input of impeller 41 for recirculation through the gas flow channels 4a–4d.

An important feature in the laser illustrated in FIGS. 1 and 2 is the laser optical cavity 3 which, as described above, is folded so as to be constituted of four legs 3a–3d arranged in a square configuration in a common plane, with a folding mirror 33, 34, 35 between each pair of legs. These folding mirrors are disposed so that the laser rays are alternately transposed from the upstream (or downstream) side of one leg to the downstream (or upstream) side of the next adjacent leg, with respect to the gas flowing transversely across the legs. As indicated earlier, this arrangement provides compensation for phase distortion due to the density gradient, and also compensation for amplitude variations due to the gain gradient in the gas flowing transversely across the legs.

This will be more apparent by tracing the path of the extreme rays $R_1$ and $R_2$ through all four of the laser channel legs 3a–3d, starting from the primary mirror 31 to the feedback mirror 32. Thus, as shown in FIG. 2, ray $R_1$ is on the upstream side of the gas flow channel 4a for laser channel leg 3a, and ray $R_2$ is on the downstream side in laser channel leg 3a. However, rays $R_1$ and $R_2$ are transposed by the first folding mirror 33 between laser channel legs 3a and 3b, so that in leg 3b ray $R_1$ appears on the downstream side of the flow channel, and ray $R_2$ appears on the upstream side. A similar transposition is produced by folding mirror 34, which returns ray $R_1$ to the upstream side and ray $R_2$ to the downstream side in leg 3c; and another transposition is effected by folding mirror 35 which again reflects ray $R_1$ to the downstream side and ray $R_2$ to the upstream side in leg 3d.

Thus, any phase distortion due to the density gradient (inverse to the temperature gradient) in one leg will be compensated for in the next adjacent leg; and similarly any amplitude variations due to the gain gradient in one leg and any velocity variations due to turns in the flow, will also be compensated for by the transposition in the next adjacent leg. Maximum compensation is thus provided by including an even number of legs in the laser channel so that the variations in one leg cancel those in the next, and by providing a separate flowing gas channel for each of the laser channel legs so that the gas flow is in parallel rather than in series across the respective legs.

In addition, the polygonal configuration for the folded laser channel legs provides a compact arrangement which maximizes the resonator length for a given system volume, and which also makes efficient use of the inward radial flow of the gas for maximizing the cooling for a given system volume. Further, since only one folding mirror is required between the laser channel legs, as distinguished from two folding mirrors required in the previously-known "roof-top mirror" technique, the power loss resulting from the second folding mirror is avoided, thereby significantly increasing the power output for a given system volume. Still further, since a separate, parallel, flowing gas channel is provided for each leg of the folded laser channel, as distinguished from the "roof-top mirror" technique wherein two laser legs are arranged in series with a common gas channel, the compensation for phase distortion and amplitude variations is considerably improved over that of the "roof-top mirror" technique.

Figure 3:
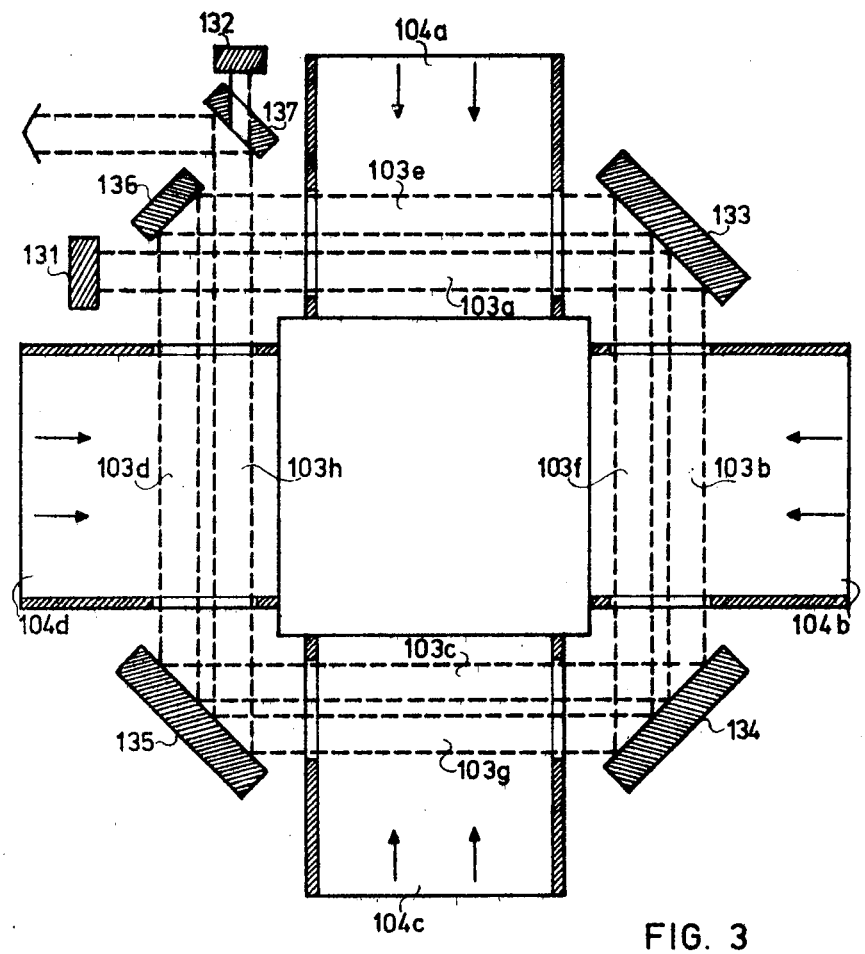
FIG. 3 is an enlarged view illustrating a variation in the folded laser channel which may be included in the laser of FIGS. 1 and 2.

FIG. 3 illustrates another folded laser channel arrangement for further increasing the resonator length for a given system volume, while at the same time providing the above-described compensation for phase distortion and amplitude variations in the gas flowing transversely across the laser channel legs. Briefly, this is accomplished in FIG. 3 by folding the laser channel to form a plurality of legs having an overall length greater than that of a single polygon as in FIGS. 1, 2. In the embodiment illustrated in FIG. 3, the laser channel is folded into a plurality of legs of a configuration defining two complete squares in coaxial relationship to each other, so that the laser channel has an overall length extending 720°, rather than 360° in the FIGS. 1, 2 embodiment.

Thus, the laser channel in FIG. 3 also defines a resonator or optical cavity between a primary mirror 131 and a feedback mirror 132. The optical cavity includes eight legs constituting the sides of two coaxial squares; a plurality of folding mirrors 133, 134, 135 and 136; and a scraper mirror 137 removing the portion of the beam or mode outputted from the laser. Thus, laser channel leg 103a is between the primary mirror 131 and folding mirror 133; leg 103b is between folding mirrors 133, 134; leg 103c is between folding mirrors 134 and 135; leg 103d is between folding mirrors 135, 136; leg 103e is between folding mirrors 136, 133; leg 103f is between folding mirrors 133, 134; leg 103g is between folding mirrors 134, 135; and leg 103h is between folding mirror 135 and feedback mirror 132.

It will be seen that leg 103a is parallel to leg 103e, and both are transversed by the gas flowing through gas channel 104a; leg 103b is parallel to leg 103f, and both are traversed by the gas flowing through channel 104b; leg 103c is parallel to leg 103g, and both are traversed by the gas flowing through channel 104c; and leg 103d is parallel to leg 103h, and both are traversed by the gas flowing through channel 104d. It will also be seen that folding mirrors 133, 134 and 135 are of double width as compared to the corresponding mirrors 33-35 in FIG. 2, and that each effects two reflections of the laser rays, one at the upper portion of the reflector and the other at the lower portion thereof.

To be particularly noted in the folded laser channel arrangement illustrated in FIG. 3 is the fact that not only are the upstream and downstream rays alternately transposed from one leg to the next with respect to the gas flowing through the respective channel of each pair of legs, but also the beam or mode itself, within each channel leg, is transposed from one leg to the other. Thus, with respect to gas flowing through channel 104a, leg 103a is on the downstream side of that channel and leg 103e is on the upstream side of the channel; whereas in the next channel 104b, these have been transposed so that the laser beam or mode 103b, produced by the reflection of mode 103a by reflector 133, is now on the upstream side of the gas flow channel 104b, and mode 103f is on the downstream side. This transposition of the complete beam or mode in each leg as described above in the arrangement of FIG. 3, together with the transposition of the rays within each leg as described above with respect to FIGS. 1-2, further improves the compensation for phase distortion and for amplitude variations in the gas flowing transversely across each pair of legs, in addition to providing the above-mentioned advantages of further maximizing the resonator length and heat dissipation for a given system volume.

Figure 4:
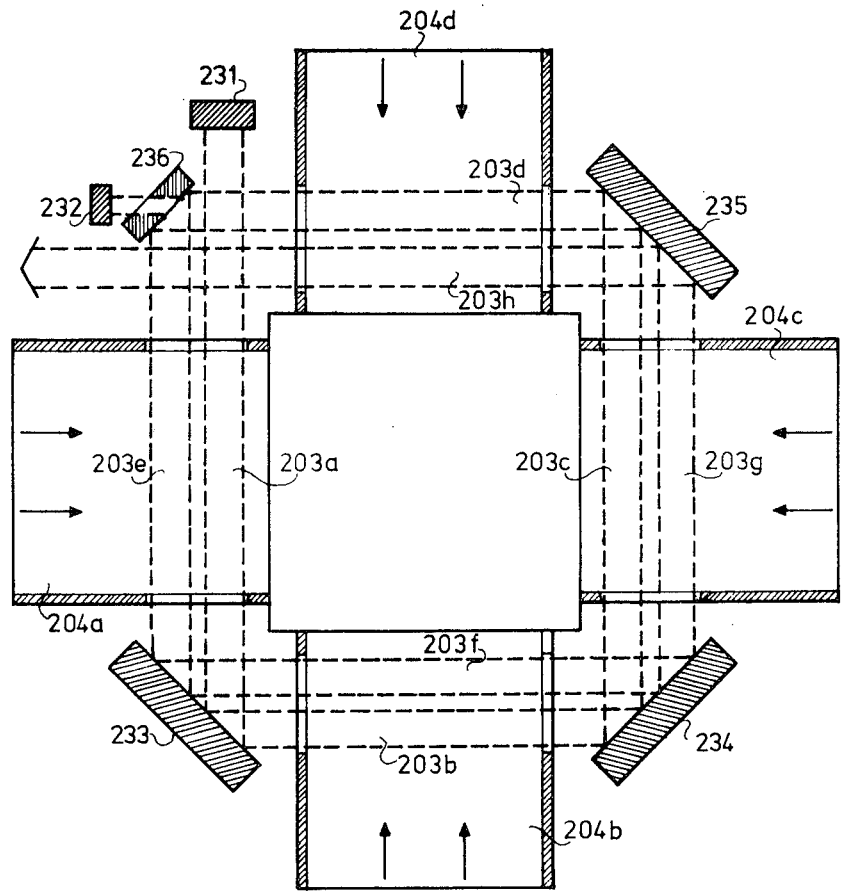
FIG. 4 illustrates another form of folded laser channel constructed in accordance with the present invention to provide both a resonator region and an amplifier region.

FIG. 4 illustrates a still further arrangement wherein the laser channel is folded to form a plurality of legs defining an optical cavity or resonator region, followed by a plurality of legs defining an amplifier region, with the legs of both regions being alternately transposed to provide compensation for phase distortion due to the density gradient and for amplitude variations due to the gain gradient in the flowing gas.

Thus, as shown in FIG. 4, the laser channel comprises a primary mirror 231, a feedback mirror 232, three folding mirrors 233-235, and a scraper mirror 236. Laser channel legs 203a-203d upstream of the scraper mirror 236 define the resonator region; and legs 203e-203h downstream of the scraper mirror 236 define the amplifier region.

As shown in FIG. 4, leg 203a of the resonator region is parallel to leg 203e of the amplifier region, and both are traversed by the gas flowing through flow channel 204a. In a similar manner, each of the other three gas flow channels 204b-204d is common to one leg of the resonator region and one leg of the amplifier region. This arrangement, as illustrated in FIG. 4, effects alternate transpositions between the resonator leg and the amplifier leg common to each gas flow channel, so that in one channel one leg is on the upstream side and in the next succeeding channel it is on the downstream side. Thus, the arrangement illustrated in FIG. 4 also effects the above-described compensation for phase distortion and amplitude variations, not only by the alternate transpositions of the rays within each leg, but also by the alternate transpositions of the mode in one resonator leg with the beam in one amplifier leg in the respective gas flow channels.

Figure 5:
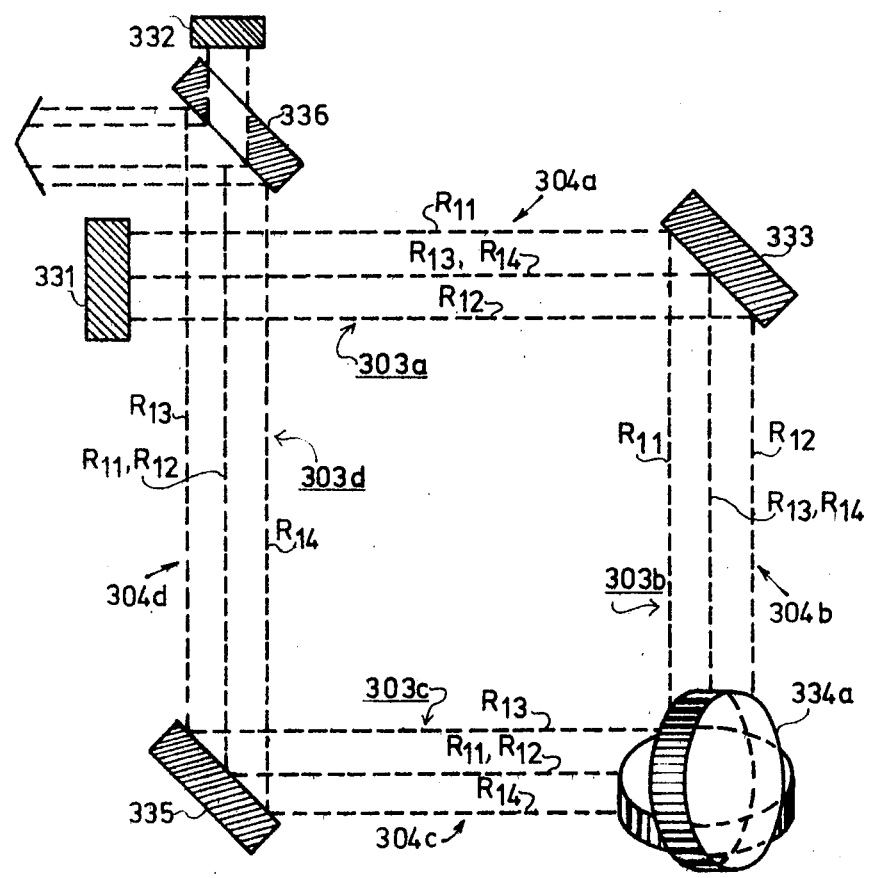
FIG. 5 schematically illustrates a still further form of folded laser channel constructed in accordance with the present invention to provide two-dimensional compensation for phase distortion and amplitude variations.

FIG. 5 illustrates a still further arrangement wherein two-dimensional compensation is provided, i.e., not only in the direction of the gas flow, but also transverse to the direction of the gas flow. Briefly, this is accomplished by disposing two of the legs of the folded laser channel in one plane with a single folding mirror between them, and disposing the other two legs in a second plane, parallel to the first plane, also with a single folding mirror between them, the contiguous legs between the two planes being connected together by a double-folding mirror to effect the reflection from one plane to the other.

More particularly, the laser channel illustrated in FIG. 5 comprises a primary mirror 331, a feedback mirror 332, four folding mirrors 333, 334a, 334b, 335, and a scraper mirror 336. Laser channel legs 303a and 303b are in one plane and are connected together by the single folding mirror 333; and laser channel legs 303c and 303d are in a second plane, spaced from but parallel to that of legs 303a and 303b, and are connected together by the single folding mirror 335. The remaining two folding mirrors 334a and 334b are at a right angle to each other and at a 45° angle to the respective leg so that they define a double-folding mirror for reflecting the rays from leg 303b of the first-mentioned plane of legs 303a, 303b, to leg 303c of the second-mentioned plane of legs 303c, 303d.

It will be appreciated that primary mirror 331 is in the plane of legs 303a, 303b and folding mirror 333; whereas feedback mirror 332 and scraper mirror 336 are in the plane of legs 303c, 303d and folding mirror 335. It will also be appreciated that, as in the previously-described arrangements, a separate gas flow channel, designated 304a-304d respectively in FIG. 5, is provided for each of the folded laser channel legs 303a-303b, each gas flow channel directing the gas transversely across the respective laser channel leg and radially inwardly to an inner collection region within the folded laser channel.

The arrangement illustrated in FIG. 5 provides a two-dimensional compensation, i.e., not only parallel to (as in FIGS. 1-4) but also transversely to the direction of the gas flow, to compensate for phase distortion due to the density gradient, and for amplitude variations due to the gain gradient, in the gas flowing through the respective gas channels transversely across the laser channel legs. Thus, it will be seen that in laser channel leg 303a, ray $R_{11}$ is on the upstream side with respect to the gas channel; ray $R_{12}$ is on the downstream side; and rays $R_{13}$, $R_{14}$ are in the middle but on opposite sides of leg 303a. The first folding mirror 333, reflecting the rays from leg 303a to leg 303b in the same plane, transposes the two rays $R_{11}$, $R_{12}$, so that ray $R_{11}$ is now on the downstream side, and ray $R_{12}$ is on the upstream side. The two intermediate rays $R_{13}$ and $R_{14}$ are not transposed, but remain in the same intermediate positions as in leg 303a.

Now, as the rays impinge mirror 334a and then mirror 334b, to reflect them from the first plane of leg 303b to the parallel plane of leg 303c, a transposition is effected such that rays $R_{11}$ and $R_{12}$ now become the intermediate rays at opposite sides of the channel leg whereas ray $R_{13}$ now becomes the downstream ray, and ray $R_{14}$ now becomes the upstream ray in channel leg 303c. The single reflecting mirror 335 effects another transposition of the rays so that ray $R_{13}$ is now transposed to the upstream side of the channel leg, and ray $R_{14}$ is now transposed to the downstream side of the channel leg, the two remaining rays $R_{11}$ and $R_{12}$ remaining in their intermediate positions in channel leg 303d. The rays are reflected by the feedback mirror 332 (except for the portion removed by the scraper mirror 336) back through all the laser channel legs and assume the same relative positions in these legs as described above in their forward pass through them.

It will thus be seen that the mode within the folded laser channel resonator, defined by the primary mirrors 331 and the scraper mirror 336 (or feedback mirror 332), has been transposed once in the plane of the gas flow and once transverse to the plane of the gas flow, so that the laser beam outletted by the scraper mirror 336 has been provided with compensation in both dimensions for phase distortion due to the density gradient, for velocity variations due to turns in the flow, and for amplitude variations due to the gain gradient, in the gas flowing transversely across the respective laser channel legs.

While the invention has been described with respect to several preferred embodiments, it will be appreciated that many other variations, modifications and applications of the invention may be made.

What is claimed is:

1. A high-power flowing-gas laser including a laser channel and means for producing a flow of a laser gas transversely across the laser channel; characterized in that said laser channel is folded to include at least two legs angularly disposed to each other in a common plane and having a single folding mirror between the two legs such that the laser rays through one leg, on the upstream side thereof with respect to the gas flowing transversely across said one leg, are reflected by said folding mirror so as to be transposed to the downstream side of the other leg with respect to the gas flowing transversely across the other leg.

2. A laser according to claim 1, wherein said means for producing said flow of laser gas transversely across said laser channel comprises a separate flowing gas channel for each of said legs of the laser channel.

3. A laser according to claim 2, wherein said laser channel is folded to include more than two, but an even number, of said legs in a common plane, there being a single folding mirror between each pair of adjacent legs in said common plane.

4. A laser according to claim 2,, wherein said laser channel is folded to include an even number of at least two legs in one plane, and an even number of at least two legs in a second parallel plane, there being a single folding mirror between the adjacent legs of each plane, and a double-folding mirror between the connecting adjacent legs of the two planes, said legs and folding mirrors being arranged to provide compensation, both parallel to and transversely to the direction of the gas flow, for phase distortion due to the density gradient, and for amplitude variations due to the gain gradient, in the gas flowing transversely across said legs.

5. A laser according to claim 1, wherein said laser channel includes more than two of said legs folded in a polygonal configuration, there being a separate flowing gas channel for each leg, each channel directing the gas flow radially inwardly to a common collection region for the gas.

6. A laser according to claim 5, wherein there are an even number of laser channel legs in said polygonal configuration.

7. A laser according to claim 6, wherein there are four laser channel legs arranged in a square configuration.

8. A laser according to claim 7, wherein all four of said laser channel legs are disposed in a common plane, there being a single folding mirror between each pair of adjacent legs in said common plane.

9. A laser according to claim 7, wherein two adjacent legs are disposed in one plane with a single folding mirror between them, and the remaining two legs are disposed in a second, parallel plane with another single folding mirror between them, there being a double-folding mirror between the connecting legs of the two planes, all of which legs and folding mirrors are arranged to effect alternate transpositions of the rays through said laser channel legs such as to provide compensation, both longitudinally of and transversely of the direction of the gas flow, for phase distortion due to the density gradient, and for amplitude variations due to the gain gradient, in the gas flowing through the respective gas channels transversely across said laser channel legs.

10. A high-power flowing-gas laser including a laser channel and means for producing a flow of a laser gas transversely across the laser channel; characterized in that said laser channel is folded to include an even number of at least four legs arranged in a polygonal configuration; there being a folding mirror between each pair of legs disposed such that the laser rays are transposed from the upstream side of one leg to the downstream side of the next adjacent leg, and vice-versa, with respect to the gas flowing transversely across the legs, thereby providing compensation for phase distortion due to the density gradient, and compensation for amplitude variation due to the gain gradient, in the gas flowing transversely across the laser channel legs; there being a separate flowing gas channel for each leg, each channel directing the gas flow radially to a collection region.

11. The laser according to claim 10, wherein said laser channel is folded to include four legs arranged in a square configuration.

12. The laser according to claim 11, wherein all four of said laser channel legs are disposed in a common plane, there being a single folding mirror between each pair of adjacent legs in said common plane.

13. The laser according to claim 11, wherein two of said legs are disposed in one plane with a single folding mirror between them, and the remaining two legs are disposed in a second, parallel plane with another single folding mirror between them, there being a double folding mirror between the connecting legs of the two planes, all of which legs and folding mirrors are arranged to provide compensation, both parallel to and transversely to the direction of the gas flow, for phase distortion due to the density gradient, and for amplitude variations due to the gain gradient, in the gas flowing through the respective gas channels transversely across said laser channel legs.

14. A laser according to claim 10, wherein said means for producing a flow of a laser gas includes an impeller having an inlet receiving the gas from an inner collection region within said folded laser channel, and an outlet through which the gas is pumped radially outwardly of said folded laser channel.

15. A laser according to claim 14, further including a heat exchanger within said inner collection region upstream of the impeller inlet.

16. A laser according to claim 10, wherein said folded laser channel has an overall length equal to that of a single polygon.

17. A laser according to claim 10, wherein said folded laser channel has an overall length greater than that of a single polygon.

18. A laser according to claim 17, wherein said folded laser channel is folded to define two polygons in coaxial relationship to each other.

19. A laser according to claim 10, wherein said folded laser channel defines a resonator.

20. A laser according to claim 10, wherein said folded laser channel defines a resonator region followed by an amplifier region.

21. A laser according to claim 20, wherein said folded laser channel includes a first polygon of legs defining said resonator region, and a second polygon of legs coaxial with said first polygon and defining said amplifier region.

* * * * *